US007704345B2

(12) United States Patent
Bosshardt

(10) Patent No.: US 7,704,345 B2
(45) Date of Patent: Apr. 27, 2010

(54) PROCESS ALLOWING CYLINDRICAL-WALLED CONTAINERS TO BE DECORATED AT A FAST RATE

(75) Inventor: Michel Bosshardt, Sainte-Ménéhould (FR)

(73) Assignee: Cebal SAS, Gennevilliers (FR)

( * ) Notice: Subject to any disclaimer, the term of this patent is extended or adjusted under 35 U.S.C. 154(b) by 875 days.

(21) Appl. No.: 10/597,878

(22) PCT Filed: Feb. 8, 2005

(86) PCT No.: PCT/FR2005/000273

§ 371 (c)(1), (2), (4) Date: Aug. 10, 2006

(87) PCT Pub. No.: WO2005/077662

PCT Pub. Date: Aug. 25, 2005

(65) Prior Publication Data

US 2007/0119537 A1 May 31, 2007

(30) Foreign Application Priority Data

Feb. 10, 2004 (FR) .................................. 04 01274

(51) Int. Cl.

| | |
|---|---|
| ***B29C 37/02*** | (2006.01) |
| ***B29C 65/72*** | (2006.01) |
| ***B32B 37/10*** | (2006.01) |
| ***B32B 37/14*** | (2006.01) |
| ***B32B 38/06*** | (2006.01) |
| ***B32B 39/00*** | (2006.01) |
| ***B65C 9/06*** | (2006.01) |
| ***B65C 9/12*** | (2006.01) |
| *B32B 37/04* | (2006.01) |
| *B32B 37/02* | (2006.01) |
| *B32B 38/10* | (2006.01) |
| *B29C 65/74* | (2006.01) |

(52) U.S. Cl. ....................... 156/232; 156/230; 156/238; 156/244.27; 156/358; 156/361; 156/363; 156/367; 156/378; 156/379; 156/447; 156/DIG. 6; 156/DIG. 9; 156/DIG. 10; 156/DIG. 11; 156/DIG. 26

(58) Field of Classification Search ................. 156/230, 156/231, 232, 238, 242, 244.17, 244.27, 156/247, 249, 358, 361, 363, 367, 378, 379, 156/429, 446, 447, DIG. 6, 8–11, 26–28

See application file for complete search history.

(56) References Cited

U.S. PATENT DOCUMENTS 4,105,491 A * 8/1978 Haase et al. ................ 156/553

(Continued)

FOREIGN PATENT DOCUMENTS

DE 3743676 A1 * 7/1989

(Continued)

*Primary Examiner*—Philip C Tucker
*Assistant Examiner*—Sonya Mazumdar
(74) *Attorney, Agent, or Firm*—Banner & Witcoff, Ltd.

(57) ABSTRACT

A method for decorating the cylindrical walls of receptacles, comprising the following steps: a) moveable mandrels are arranged in a loop and are displaced, keeping their axes parallel to a direction D; b) each receptacle is engaged by the cylindrical wall thereof on the mandrel; c) the mandrel is brought into the vicinity of a marking cylinder which turns about a fixed axis parallel to direction D; d) the mandrel is rotated at a speed which is correlated with that of the marking cylinder; e) a transfer film support strip is displaced between the marking cylinder and the mandrel; f) the marking cylinder and mandrel are placed in contact with each other such that the marked area of the transfer film adheres to the cylindrical wall; g) the support strip is removed from the cylindrical wall of the receptacle. The inventive method is adapted to the manufacture of flexible tubes and can be easily implemented on existing devices such as capping machines.

26 Claims, 2 Drawing Sheets

U.S. PATENT DOCUMENTS

| | | | | | |
|---|---|---|---|---|---|
| 4,175,993 | A | * | 11/1979 | Robertson | 156/234 |
| 5,464,495 | A | * | 11/1995 | Eder | 156/456 |
| 5,650,037 | A | | 7/1997 | Larson et al. | |
| 5,753,350 | A | * | 5/1998 | Bright | 428/195.1 |
| 5,858,143 | A | * | 1/1999 | Bright et al. | 156/86 |
| 6,098,689 | A | * | 8/2000 | Fiwek | 156/540 |
| 6,338,263 | B1 | | 1/2002 | Obata et al. | |
| 6,531,018 | B1 | | 3/2003 | Fiwek | |
| 6,607,800 | B1 | | 8/2003 | Brandt et al. | |
| 2003/0015297 | A1 | | 1/2003 | Brandt et al. | |

FOREIGN PATENT DOCUMENTS

| | | | | |
|---|---|---|---|---|
| JP | 11147255 | A | * | 6/1999 |
| WO | WO 9803279 | A1 | * | 1/1998 |
| WO | WO03103966 | A | | 12/2003 |
| WO | WO 2005077662 | A2 | * | 8/2005 |

* cited by examiner

PROCESS ALLOWING CYLINDRICAL-WALLED CONTAINERS TO BE DECORATED AT A FAST RATE

CROSS REFERENCE TO RELATED APPLICATIONS

This application claims, under 35 USC §119, the benefit of priority of the filing date of Patent Cooperation Treaty patent application, Serial Number PCT/FR2005/000273, filed on Feb. 8, 2005, which is incorporated herein by reference, wherein Patent Cooperation Treaty patent application Serial Number PCT/FR2005/000273 was not published under PCT Article 21(2) in English.

This application also claims, under 35 USC §119, the benefit of priority of the filing date of French patent application, Application No. FR 0401274, filed on Feb. 10, 2004, which is incorporated herein by reference.

FIELD OF THE INVENTION

The invention relates to a process for decorating the cylindrical walls of containers, for example the cylindrical skirts of flexible tubes before they are filled with the product they are intended to dispense. It relates more particularly to decoration by hot stamping or hot coating with transfer films. Any type of cylindrical wall is envisaged: metal, typically of aluminum alloy, laminated metal foil or entirely plastic, single or multilayer.

BACKGROUND OF THE RELEVANT ART

The invention relates to the field of applicators for cosmetic products, typically mascara applicators, provided with a brush.

At the present time, hot stamping is applied to tube skirts mainly to implement decorations giving shiny effects similar to those given by noble metals, such as gold or silver. Until the present invention such decorations, being quite expensive to implement, were reserved for tubes containing products with a high added value, typically cosmetic products.

The problem intended to be resolved by the invention relates to decorating the flexible tube skirt when this can only be decorated after it has been shaped into a roll. This is certainly true in respect of tubes made of aluminum alloy. It is also systematically true for tubes made entirely of plastic material the skirt of which is obtained by extrusion and known as "plastic tubes". It may also occur in respect of tubes made entirely of plastic material and known as "laminated tubes" or of laminated metal foil tubes.

Flexible so-called "laminated" plastic tubes include a head and a flexible skirt, obtained from a so-called "laminated" strip that generally includes several plastic layers. The skirt is obtained by cutting out of a cylindrical sleeve, itself obtained by rolling a planar strip. The rolling is effected such that the strip is shaped into a roll, with the edges of the strip being placed opposite each other, generally with a slight overlap, and then welded to each other. The roll so formed is cut to the required length to make the skirt then a tube head is welded to one end of the skirt.

Flexible so-called "plastic" tubes are obtained either entirely by molding (typically by injection), or, as in the case of laminates, by welding a head onto a cylindrical skirt, the cylindrical skirt having been in this case obtained by extruding a thin cylindrical section of plastic material, then cutting it to the required length.

In the case of laminated metal foil tubes or so-called "laminated" tubes, hot stamping can be applied to the strip before it is shaped into a roll with known techniques for printing on flat strips such as the one described in application FR 2,171,170 (Madag), where the strip is marked by a printing device comprising a swivel-mounted oscillating arm which compresses the moving strip while remaining supported on a roller or the one described in U.S. Pat. No. 5,368,680 (Kurz), where speeds can be obtained by passing the strip for marking and the transfer film into the gap between a marking roll and at least one support roll.

But "laminated" tubes are not in great demand for making decorations with shiny gold or silver effects, which can only be correctly printed by transfer film. Indeed, they have, because of the way they are shaped, a highly visible longitudinal weld, which spoils the aesthetic appearance of the tube. In fact, as seen, this type of decoration generally goes with products with high added value, such as cosmetic products, but not with a longitudinal weld that is regarded as unsightly. For this reason efforts are made to print such decorations on cylindrical surfaces that do not have an obvious longitudinal weld.

Heat transfer printing on non-planar objects such as the cylindrical skirts of flexible tubes has hitherto been carried out separately since the devices used cannot operate at rates that are compatible with the other devices in the manufacturing cycle. These devices comprise a planar tool that has at each cycle an alternate forward-backward motion, typically a so-called "backstep" forward motion. An alternate motion of this kind slows down production rates, with the result that even the most high-performance machines do not exceed 60 tubes per minute. Such an operation therefore means either reducing the speed of the whole production line (in this event, this does not exceed 60 tubes per minute whereas the other components of the production line can easily reach 120 tubes per minute), or doing the hot stamping on two parallel lines or using the existing devices, or again leaving the production lines for separate treatment (discontinuity of production).

None of these solutions is satisfactory, the first and third for obvious economic reasons, the second because it drives up capital costs (increased number of machines, complexity of transfer line since the tubes to be treated have to be split up then possibly brought back together after treatment), also because it drives up equipment changeover times and because, given the multiplicity of tools employed, it leads to reduced process capability: the industrial plant implementing the process has, given the multiplicity of the machines operating in parallel, a reduced capacity for making parts in the tolerance interval laid down in the specifications, which increases the scrap factor.

U.S. Pat. No. 6,531,018 describes a process for decorating the cylindrical walls of bottles in mass production. In this process, the cylindrical walls are run past a complex pressure head provided with transfer rollers rotating freely around a movable axis. This solution, which is certainly well adapted to mass production, also drives up capital costs.

SUMMARY OF THE INVENTION

The applicant has therefore been given the objective of hot stamping decorations onto cylindrical objects on line while keeping to a production rate that is compatible with the production line, in other words able to process at least 100 tubes per minute, and preferably at least 120 tubes per minute.

FIGURES

DETAILED DESCRIPTION OF EMBODIMENTS OF THE INVENTION

Figure 1:
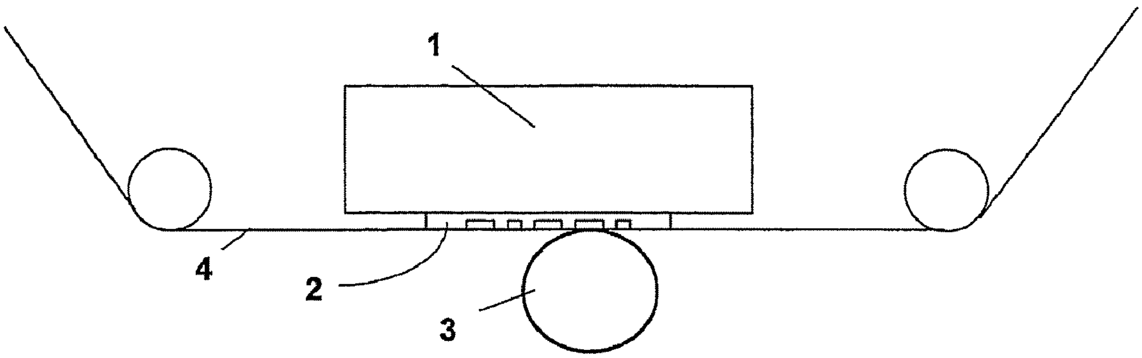
Fig. 1 ( Prior Art )
FIG. 1 shows a diagram of a device of the prior art for hot stamping cylindrical bodies.

A first object of the invention is a process for decorating the cylindrical wall of containers, characterized in that it comprises at least the following steps:

moving mandrels are used mounted on a loop circuit, each mandrel having a diameter slightly less than the diameter of the cylindrical wall of the container and being mounted on a support capable of moving in such a way that the axis of the mandrel remains parallel to a given direction D, the mandrel being mounted onto its support in such a way that it is able to rotate around its axis while resisting a force exerted perpendicular to the axis;

a) each container is successively brought flush with a mandrel then fitted onto the mandrel;

b) the mandrel thus covered with the container is brought into the vicinity of a impression roll able to rotate around an axis parallel to the direction D;

c) while it is being moved towards the impression roll, the mandrel is made to rotate around its axis;

d) a strip bearing a transfer film is run into the gap between the impression roll and the mandrel covered with the container;

e) the mandrel and the impression roll are brought into contact with each other, the cylindrical wall of the container and the surface of the impression roll being driven at a substantially equal tangential velocity, the contact translating into a force exerted by the impression roll on the mandrel through transferable film bearing strip and the wall of the container;

f) the bearing strip is then moved away from the surface of the container, with the result that the part of the transfer film remaining bonded to the container wall is detached from the bearing strip, thus bringing about the decoration;

g) the mandrel and container unit is then moved away from the impression roll in order to leave room for the next mandrel;

the process being characterized in that:

A) the impression roll is driven, for example using a motor, typically an electric motor, in a continuous rotary motion around the axis, the axis being fixed;

B) the mandrel is made to rotate at a speed correlated with that of the impression roll such that when the mandrel comes to be flush with the impression roll, the tangential velocity of the cylindrical wall of the container in rotation is substantially equal to the tangential velocity of the surface of the impression roll;

C) the transfer film bearing strip is run into the gap between the impression roll and the mandrel covered with the container such that it moves at a linear velocity substantially equal to the their own tangential velocities.

To decorate the cylindrical wall of containers, moving mandrels are used mounted on a loop circuit, for example mounted on a turntable. These moving mandrels are limited in number, typically to a few dozens. When the mandrel is mounted onto its moving support, the latter must be allowed on the one hand to rotate around its axis, on the other hand to resist a force exerted perpendicular to the axis. A rolling bearing is used for example. Preferably, the mandrel is mounted onto its moving support such that it is able also to move along its axis. In this way, a certain correction may be applied, if necessary, to the longitudinal positioning of the container, in other words to the longitudinal positioning of the decoration already printed onto its wall.

Advantageously, the turntable rotates stepwise, the mandrel finding itself at each stop flush with an area for handling or treating the container, for example: fitting the container by its cylindrical wall around a mandrel, depositing or marking a decoration onto the cylindrical wall, unloading the container provided with its decoration, etc (other stations can be used to provide various finishes for the container). For example, in the case of a flexible tube, a station may be provided for removing the sprue resulting from molding the tube head, putting on a lid to seal the dispensing orifice, automatically screwing in a stopper, or again anchoring a hinged cap, by driving it in and then snapping it onto the neck, etc.

The containers are brought in succession flush with a mandrel, typically using spikes mounted on a transfer line, then fitted onto the mandrels over a length appropriate to the decoration to be printed. For example, when flexible tubes are involved, the fitting is carried out preferably until the inside of the head comes to a stop against the head of the mandrel, which gives an axial indexing of the decoration on the tube skirt. To improve accuracy in respect of the axial indexing of the decoration, the mandrel may furthermore be actuated by an axial translation device.

The impression roll is driven in a continuous, and preferably constant, rotary motion around its fixed axis which is parallel to the direction of the mandrel axis. Preferably, the mandrel is brought into contact with the impression roll such that it exerts a force distributed as evenly as possible over a generator thereof. The distributed force is used either to deposit the decoration using the transfer film (decal), or to mark the decoration, the surface of the impression roll being etched (for example hot stamping or cold stamping or shaping a raised decoration by plastic deformation of the container wall). Moreover, the controlled tangential arrival of the mandrel in the vicinity of the impression roll ensures that the mandrel support, designed to rotate the mandrel, does not sustain too violent of a shock.

The mandrel covered with the container is driven in a rotary motion such that when the mandrel comes to be flush with this impression roll, the tangential velocity of the cylindrical wall of the container in rotation is substantially equal to the tangential velocity of the surface of the impression roll, typically equal to about ±1%, preferably equal to about ±0.5%. The mandrel is made to rotate for example by a servomotor which allows great accelerations in rotation, thus making it possible to pass from zero tangential velocity to a tangential velocity equal to that of the surface of the impression roll after a length of time less than that corresponding to the displacement of the container between the previous step of the process (for example the fitting of the container onto the mandrel) and the step of depositing or marking the decoration.

In a first embodiment of the invention, the impression roll is a marking roll: it has a surface etched in accordance with the required decoration. The force applied by the raised parts of the etched surface causes the compression of a part of the transfer film which thins out and adheres to the wall of the cylindrical container. When the bearing strip is moved away from the surface of the container, the marked part of the transfer film which remains bonded to the container wall is detached from the bearing strip, thereby bringing about the decoration to be implemented.

The marking roll is generally a large cylindrical block rotating around its axis. It is however able to assume other shapes, provided that the etched surface leans on a cylindrical surface and rotates around the axis of the cylindrical surface. Typically, the marking is made by hot stamping with a hot stamping roll being used to mark a thermal transfer film: under the effect of the temperature and pressure, the plastic material of the area marked with the transfer film acquires adhesive properties and thins out, the boundary between the marked part and unmarked part becoming, after cooling, an easy-to-tear area.

To make the hot stamped area easier to detach, the bearing strip is held against the cylindrical wall of the container for a certain time after it leaves the marking area. This time is sufficient to allow the bearing strip and the marked transfer film to cool down to a temperature that makes the film easier to detach by cutting along the boundary between the marked area and the unmarked area.

The marking roll rotates around its axis, preferably at a continuous and constant velocity, which facilitates automatic control of the rotation of the mandrel.

The bearing strip provided with the transfer film is also able to pass at a constant velocity, substantially equal at about ±1%, preferably at about ±0.5%, to the common tangential velocity of the etched surface of the marking roll and the container wall. To reduce losses due to unused transfer film parts, a system for moving the strip forward is conceivable that allows the bearing strip to be slowed down then sped up in the interval of time between the departure of one mandrel provided with a marked container and the arrival of a new mandrel provided with a container as yet unmarked. Whether or not this is at a constant speed, the bearing strip runs by moving into the marking area, in other words into the gap between the marking roll and the mandrel, with the result that it is trapped then compressed as the mandrel and the etched surface of the marking roll each move closer to the other. It runs between a feed spool and a take-up spool, passing through a succession of rollers the distribution of which makes it possible, by playing on the tension of the strip, to stabilize its run. Quite obviously, any transfer film—that is able particularly to give an effect other than that of a metallic shine—can be used.

The mandrel is brought into contact with the marking roll such that the cylindrical wall of the body is presented tangentially to the etched surface of the marking roll and that the latter exerts a force on the mandrel through the transfer film bearing strip and the container wall, the whole being driven at one and the same tangential velocity.

It is possible for example to make the mandrel rotate in the marking area, then, as soon as the linear tangential velocity of the container wall corresponds to the tangential velocity of the etched surface, the axis of the marking roll is moved towards the axis of the mandrel until the bearing strip, running at the same tangential velocity, is trapped then compressed by this movement. In this way, contact is able to be established gradually on a generatrix line of the container wall. But preferably, to simplify the kinetics of the marking roll and reduce downtimes, the axis of rotation of the marking roll is kept fixed and the mandrel is rotated before it reaches the vicinity of the marking roll, acting such that it is able to reach the appropriate velocity before reaching the marking area. The position of the marking roll axis is defined relative to the trajectory of the mandrels such that when they come into contact with each other, a force is applied to the contact generatrix line that is weak enough for the mandrel to be able to resist mechanically and strong enough for the transfer film to be marked by the raised parts of the etched surface of the roll.

Again to simplify the kinetics of the marking device, mandrels are preferably used that have, at least flush with the wall of the container intended to be marked, a cylindrical wall of circular straight cross-section. The container wall is not necessarily cylindrical with a circular cross-section but it must be sufficiently flexible to be able to conform to the cylindrical circular shape of this part of the mandrel when the container is fitted and held on the mandrel. For example, in the case of flexible elliptical tubes, the marking area of the skirt is located far enough away (typically at a distance corresponding to the radius of the cylindrical circular part of the mandrel) from the dispensing head since the peripheral edge of the shoulder—more rigid—is not axially symmetric.

When the marking is made by hot stamping with a transfer film giving for example a shiny (gold, silver) appearance on a cylindrical flexible tube skirt made of low density polyethylene with a thickness of between 250 and 600 microns, preferably close to 400 microns, the support force is between 2 N/mm and 40 N/mm whereas the etched surface of the marking roll is taken to a temperature of between 80° C. and 250° C.

Once the hot stamping is achieved, the bearing strip remains supported against the mandrel over a given angular aperture, sufficiently large (at least 20°, preferably at least 30°) to allow the bearing strip and the marked transfer film to move away from the heating block and to cool down to a temperature that makes the film easier to detach by cutting along the boundary between the marked area and the unmarked area but the angular aperture is limited by reason of the space requirement, since it cannot cut the trajectory of the containers mounted on the moving mandrels. Typically, the bearing strip is held against the cylindrical wall of the container, until the latter reaches an average temperature below 80° C., and preferably below 60° C.

So that the bearing strip remains as long as possible supported against the mandrel, in other words to increase this aperture angle as far as possible,

- the speed of rotation of the drive device can be servo-driven downstream from the bearing strip such that at the moment of marking, the tension of the strip is as low as possible as it leaves the gap in the marking device.
- it is also possible, during marking, to make a strip drive device move so that it enters the trajectory of the mandrels but that it allows the bearing strip to be applied over a much larger angular aperture typically over 30°, preferably over 45°. As soon as the decoration is deposited on the container wall, the drive device is returned to a position such that the mandrel is able to move without colliding with it.

Another possible solution to make a hot-stamped decoration easier to detach, a solution that arises concurrently with one or other of the previous ones, consists in sweeping the bearing strip with a cold airflow as it leaves the hot stamping gap.

The bearing strip is therefore moved away from the container surface, so that the marked part of the transfer film remaining bonded to the container wall is detached from the bearing strip, thereby bringing about the decoration. Since the mandrel is able to revolve upon itself with the etched surface of the marking roll in continuous support, the decoration can be made over the whole circumference of the container wall.

This decoration may be axially symmetric but it is possible to apply the decoration at a required position on the cylindrical wall of the container: after fitting the container onto the stationary mandrel, the mandrel is rotated and an optical determination is made of a pre-marked index on the container—for example during the offset printing of a decoration with no shiny gold or silver effect on the container—and the rotation of the mandrel is calculated such that the container comes into contact with the roll surface by presenting itself according to a preset angular position. The device proposed in the example hereinafter includes a piece of equipment which makes it possible to effect such an angular indexing.

Generally speaking the decoration positioning index is pre-printed in a not very visible spot, in other words as far away as possible from the most exposed place of the decoration, namely the part of the decoration designed to be seen first by the consumer (particular aesthetic feature, brand-name, slogan, etc). In fact the lack of precision of the pre-print added to that of the marking may give, despite the use of the optical tracking device mentioned above, discrepancies that may spoil the visual appearance required for this strategic part of the decoration. To avoid this, the optical tracking device mentioned above is advantageously complemented by a second optical device, typically a video camera, connected to a corrective information system, which through the use of image analysis software, allows the position of the mandrel to be reset accurately both angularly (by modifying the angular correction mentioned above) and axially (by correction using an axial translation device actuating either the mandrel or the marking roll).

The process according to the invention may also extend to the formation of a raised decoration on the cylindrical wall of containers. In such a case, it is not necessary to run a transfer film bearing strip since the etched surface is driven directly into the cylindrical wall. The angular indexing principle mentioned in the previous paragraph may also be applied.

The process according to the invention may also extend to the decoration of the cylindrical wall of a container where the decoration would be pre-printed using an ink or varnish which would retain or conversely reject the transfer film coming to be applied uniformly on the cylindrical wall of the container under the effect of the support of an unetched roll.

Another purpose of the invention is a device implementing the process above when applied to the decoration of cylindrical bodies, typically the cylindrical skirts of flexible tubes characterized in that it involves a machine that includes a fixed plate placed opposite a turntable operating stepwise, the turntable being provided with mandrels that are able to rotate around their axes, the axes being parallel to the axis of rotation of the plate, the mandrels being brought in succession during the rotation of the plate into several work areas provided on the fixed plate, these work areas including at least:

h) a feed area where the cylindrical bodies are brought opposite a mandrel then fitted around the mandrel;

i) a marking area including:

at least one marking roll in continuous rotation, preferably with a constant speed of rotation, the axis of which is placed at a spot such that when a mandrel comes to be flush with the roll, it comes into contact with the mandrel by exerting a support force, preferably distributed over a generator;

the mandrels being driven by rotation means, typically servomotors, that make it possible to pass from zero tangential velocity to a tangential velocity equal to that of the marking roll after a length of time less than that corresponding to the movement of the container from one work area to the next;

c) an area for removing the cylindrical bodies.

The marking area may include more than one marking roll which allows production rates to be increased by simultaneous treatment of several containers. This nonetheless requires an adjustment of the plate and of the other work areas since the containers must be consistently displaced and treated simultaneously as a group.

For marking using a transfer film, this device is advantageously complemented in the marking area by a transfer film bearing strip running device, running the strip such that it passes through the space between the marking roll and the surface of the cylindrical body when a mandrel is brought into this work area, the device being provided with systems that allow the tension of the strip to be controlled, particularly as it leaves the gap in the marking device. To hot mark using a thermal transfer film, the marking roll is preferably hot.

When the cylindrical bodies are flexible tubes, the new device may advantageously result from the provision of an existing device, called a capping machine, in which is possible to find:

- the area for feeding the flexible tubes and fitting the cylindrical skirts of the flexible tubes around the mandrel;
- an optional area for removing the sprue on the tube head, for example when it has been obtained by overmolding on a skirt end in a previous stage of the process; removing the sprue resulting in the creation of the dispensing orifice;
- an optional area for putting a lid on the dispensing orifice;
- an optional area for capping where typically, the caps are brought individually flush with a tube, rotated then screwed onto the threaded neck of the head (as with screw-in stoppers) or driven in and then snapped onto the neck (as with rigid caps provided with swivel covers (service caps)).
- an area optional and recommended when it is desired to make an indexed decoration—for identifying a spot representing the decoration already printed, the area preferably being directly upstream from the marking area; this area may also be fitted with an additional device, typically a video camera, connected to a corrective information system which, using image analysis software, allows the position of the mandrel to be accurately reset both angularly and axially;
- the marking area;
- an optional area for inspecting (typically using a video camera), the decorations obtained (positioning, quality of transfer, detachment, reliefing, etc)
- the area for removing the flexible tubes.

To place a marked decoration (or a raised decoration) accurately on a decoration that is already printed, the following process may be adopted:

The work station located directly upstream from the hot stamping station is provided with an optical tracking system allowing the angular position of a spot embodying a particular known point of the decoration already printed to be detected using a photoelectric cell. The mandrels are provided with drive means which allow them to be actuated by rotation by running a belt. Typically the drive belt is notched and drives a notched wheel integral with the axis of rotation of the mandrel.

The notched belt is run past the marking station (station n) and the station directly upstream (station (n−1)), such that the mandrels remain in constant contact with the belt from the start of the tracking stage (station (n−1)) to the end of the marking stage (station n). The displacement of the belt is regulated by a single servomotor. Since, by their construction, the two mandrels placed in these work stations rotate in a synchronized way, and since the mandrel at the marking station is in phase with the rotation of the marking roll—the velocity of rotation of the mandrel is defined such that the cylindrical surface of the body and the etched surface of the marking roll have the same tangential velocity—, all that is needed, in order to find out the angular offset relative to the mandrel involved in marking and consequently relative to the etched surface of the marking roll is to detect the angular position of the pre-printed index of the body placed on the mandrel located at station (n−1). Using an appropriate algorithm, the automatic control system calculates the necessary correction to bring the body into the right position and to the right velocity at the marking station n. This correction is made during the displacement of the mandrel from station (n−1) to station n. The use of a common drive belt at these two stations, the belt being itself driven by a single servomotor, allows accuracy to be improved by avoiding any re-start slack resulting from changing the motor or belt.

Obviously, the same capping machine can be used to apply raised decorations: the bearing strip is removed from the transfer film and the drive device from the strip.

Another purpose of the invention is a process to decorate the cylindrical walls of containers wherein, instead of marking the areas defining the decoration, they are printed with a varnish or a so-called "receptive" ink, in other words an ink that includes an adhesion promoting agent that favors the adhesion of the transfer film to the printed decoration, typically a varnish or ink that includes sub-polymerized organic (for example acrylic, etc) particles. The roll is then a simple support roll exerting pressure on the wall of the container such that the part of the transfer film adhering to the printed part of the wall is detached from the bearing strip when the latter is moved away from the container wall. The process thus includes the following steps:

j) moving mandrels (12, 13) are used mounted on a loop circuit, each mandrel having a diameter slightly less than the diameter of the cylindrical wall of the container and being mounted on a support capable of moving such that the axis of the mandrel remains parallel to a given direction, the mandrel being mounted onto its support in such a way that it is able to rotate around its axis while resisting a force exerted perpendicular to the axis;

k) each container is brought in succession flush with a mandrel then fitted onto the mandrel;

l) the cylindrical wall of each container is printed in accordance with the required decoration with an ink or varnish promoting the adhesion of a transfer film;

m) the mandrel thus covered with the container is brought into the vicinity of a impression roll, the roll being driven in a rotary motion around its axis;

n) as it moves towards the impression roll, the mandrel is made to rotate at a velocity correlated with that of the impression roll such that when the mandrel comes to be flush with the impression roll, the tangential velocity of the container wall in rotation is substantially equal to the tangential velocity of the surface of the impression roll;

o) a transfer film bearing strip is made to run in the gap between the impression roll and the mandrel covered with the container, such that when it reaches the gap, it moves at a linear velocity substantially equal to their circumferential velocities;

p) the mandrel and the impression roll are brought into contact with each other, the contact translating into a force exerted by the impression roll on the mandrel through the transfer film bearing strip and the cylindrical wall of the container, the force bringing about the compression of the transfer film, translating into an adhesion of a part of the transfer film to the printed part of the cylindrical container wall;

q) the bearing strip is then moved away from the surface of the container, so that the part of the transfer film remaining bonded to the container wall is detached from the bearing strip, thus bringing about the decorations;

r) when the entire decoration is marked, the mandrel and container unit is then moved away from the roll to leave room for the next mandrel (12).

Lastly, another object of the invention is a process similar to the previous one, wherein the cylindrical wall of each container is instead printed in accordance with the required decoration with an ink or varnish that includes an anti-adhesion agent, in other words an ink or varnish which prevents the transfer film from adhering to the printed decoration, typically an ink or varnish that includes silicon- and/or wax-based particles. When the mandrel and the impression roll are brought into contact with each other, the contact translates into a force exerted by the impression roll on the mandrel through the transfer film bearing strip and the cylindrical container wall. The force brings about the compression of the transfer film and translates into the adhesion of a part of the transfer film to the unprinted part of the cylindrical container wall. Preferably, the transfer film has adhesive properties such as hot melt for example. Preferably again, a hot impression roll is used so that when the impression roll leans against the sleeve through the transfer film, the latter acquires the adhesive properties and thereby adheres strongly to the unprinted part of the cylindrical wall of the container.

Obviously, a device with a turntable such as the one described previously can be used to apply such decorations: a station is provided for printing the tube skirt upstream from the station for applying the support roll against the tube wall through the strip bearing the transfer film. Whether the ink contains an agent that promotes or conversely inhibits adhesion, printing can be carried out using a conventional device, typically an offset machine placed on the production line upstream from the turntable device. Printing is also possible by providing a print station in the turntable device itself, upstream from the station where the transfer film is applied to the container wall. Printing can for example be carried out by flexography using an etched roll. The angular indexing of the decoration to be printed can be achieved using the process described above, the only difference being that the impression roll takes the place of the marking roll.

EXAMPLES

Prior Art Device

FIG. 1

This device comprises a marking roll 1 with a planar etched surface 2. The marking block is hot and makes it possible to hot stamp using a thermal transfer film. It moves tangentially to the wall of the container 3. Once the entire cylindrical wall is marked, it is moved away from the bearing strip 4 of hot transferable film and brought back upstream to be applied anew to a new container. It therefore performs at each cycle an alternate forward-backward motion, of the backstep kind. An alternate motion of this type slows down production rates so that even the most high performance machines do not exceed 60 tubes per minute.

Figure 2:
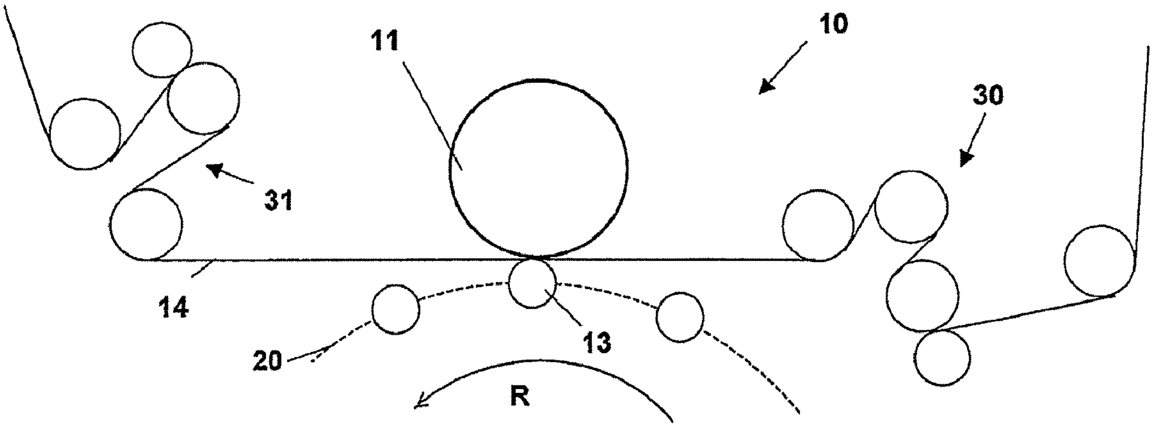
FIG. 2 shows a diagram of a device according to the invention for hot stamping cylindrical bodies.
Figure 3:
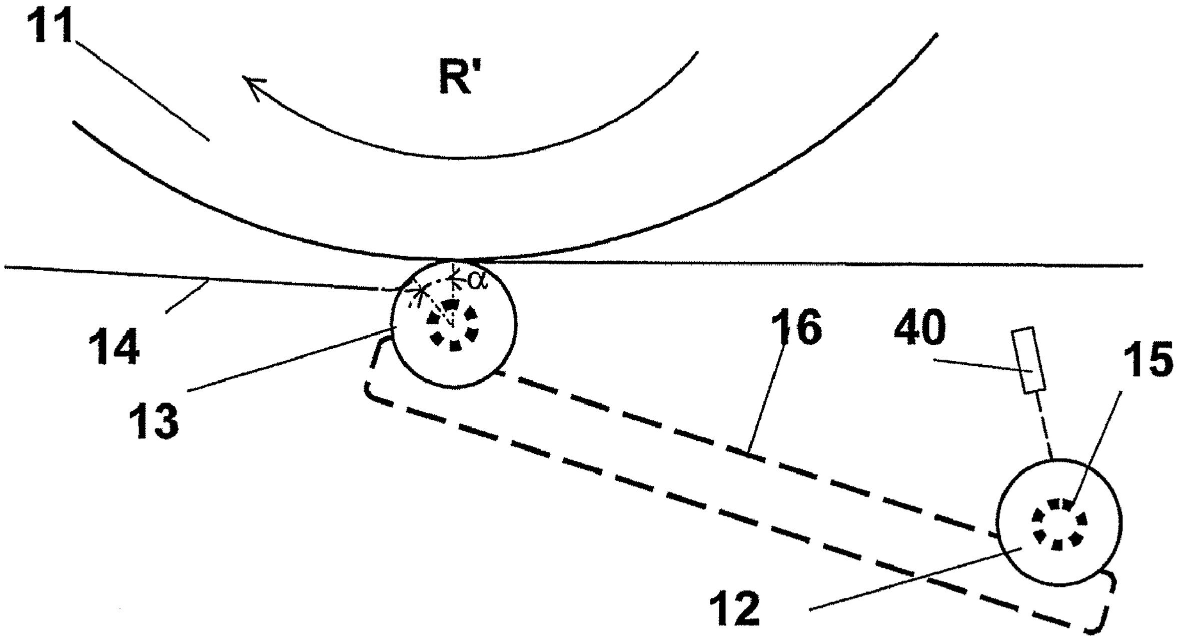
FIG. 3 shows an enlarged detail of FIG. 2*a*, showing more particularly the vicinity of the hot stamping area.

Device According to the Invention (FIGS. 2 and 3)

The device shown in diagrammatic form in FIGS. 2 and 3 corresponds to a station of a machine known as a "capping machine" which performs on-line and at great speed a certain number of finishing operations on flexible tubes. This machine includes a fixed plate placed opposite a turntable operating stepwise. The movement of the plate is symbolized in FIG. 2 by the arrow identified as R. The turntable is provided with mandrels, such as the mandrels identified as 12 and 13. These mandrels are mounted on the turntable such that their axis remains parallel to the axis of rotation of the plate and that they are able to rotate around their axis. They are furthermore guided so that they can perform a movement of small scale axial translation (about 1 mm). The mandrels follow a circular trajectory 20 and are brought in succession during the rotation of the plate into a number of work areas provided on the fixed plate:

- a first area for bringing in the flexible tubes and fitting the tubes around the mandrel (not shown)
- a area for removing the sprue on the tube head (not shown)
- an area for capping by screwing a cap into the threaded neck of the tube (not shown)
- an area for hot stamping 10 including:
- a marking roll 11 in continuous rotation R',
- a device 30 for running a bearing strip 14 of hot transferable film, bringing the strip into the gap in the marking device; the device being provided with a system of rollers 31 the arrangement and servo-driven drive velocity of which allow the tension of the bearing strip 14 to be controlled as it leaves the marking device,
- an area for removing the flexible tubes so decorated (not shown).

Between each step, the plate performs a rotation R corresponding to an angle of $2\pi/n$, n being the number of stations provided on the machine (typically n=12). During this rotation of the plate, the mandrel 12, intended to arrive at the marking station (where it is indicated by the reference number 13), is made to rotate around its axis via the displacement of a notched drive belt 16 which drives a notched wheel 15 integral with the axis of rotation of the mandrel.

The drive belt 16 is itself actuated by a servomotor (not shown), which makes it possible to move from zero tangential velocity to a tangential velocity equal to that of the hot stamping roll. The latter rotates at a velocity such that the etched surface of the marking roll 11 is moved in a given time over a circumferential length equal to the perimeter of the tube skirt. For example, for a target rate of 120 tubes per minute for a decoration with a shiny silver effect covering the entire periphery of the tube, it is necessary to target an operation lasting typically less than 0.2 s (the 0.3 s remaining being reserved for the rotation of $2\pi/n$ of the plate), which corresponds to a speed of rotation of about 5 tr/s. This speed must be reached and regulated after a length of time less than that corresponding to the displacement of the container from one work area to the next, in other words, pursuing our example, less than 0.3 seconds. A servomotor is therefore required that is capable, via the belt 16 and the notched wheel 15, of driving the mandrel with accelerations markedly above 15 $tr/s^2$. A servomotor is chosen preferably that is capable of generating accelerations in rotation of the mandrel of between 300 and 15,000 $tr/s^2$.

Once compression is achieved, the bearing strip remains supported on the mandrel over a given angular aperture, large enough (at least 20°, preferably at least 30°) to allow the bearing strip and the marked transfer film to move away from the heating block and to cool down to a temperature allowing the film to be detached by cutting along the boundary between the marked area and the unmarked area (length of time held supported of about 0.02 s). The angular aperture is however limited by reason of the space requirement, since it cannot intersect the trajectory of the containers mounted on the moving mandrels.

To hot mark a decoration accurately onto a decoration already printed, the following process is used: the work station located directly upstream from the hot stamping station, the position of which is symbolized by the mandrel 12, is fitted with an optical tracking system 40, allowing the angular position of a spot embodying a particular known point of the already printed decoration to be detected using a photoelectric cell. The mandrel 12 is provided with a notched wheel 15 integral with its axis of rotation, which allows the mandrel to be actuated in rotation by running the drive belt 16.

The notched belt 16 is run past the marking station (station n, the position of which is symbolized by the mandrel 13) and the station directly upstream (station (n−1), the position of which is symbolized by the mandrel 12), such that the mandrels are in constant contact with the belt from the start of the tracking stage (station (n−1)) to the end of the marking stage (station n). The displacement of the belt is controlled by a single servomotor. Since, through their construction, the two mandrels placed in these work stations rotate in a synchronized way, the speed of rotation of the mandrel 13 is defined such that the cylindrical surface of the body and the etched surface of the marking roll 11 have the same tangential velocity, all that is needed, in order to find out the angular offset relative to the cylindrical body of the mandrel 13 and consequently relative to the etched surface of the marking roll, is to detect the angular position of the pre-printed index on the body placed on the mandrel 12 located at the station (n−1), using the optical tracking device 40. Using an appropriate algorithm, the automatic control system calculates the correction necessary to bring the cylindrical body of the mandrel 12 into the right position and to the right velocity at the marking station n. This correction is made during the displacement of the mandrel 12 from station (n−1) to station (n).

The optical tracking device 40 is advantageously complemented by a video camera (not shown) connected to an information system which, using image analysis software, allows the position of the mandrel to be reset automatically both angularly (by modifying the angular correction mentioned in the previous paragraph) and axially (by correction using an axial translation device actuating the mandrel when the latter is still at station (n−1)).

ADVANTAGES

Another beneficial effect of the hot compression of the tubular wall is that it stabilizes dimensionally the cylindrical wall of the body, in particular when it is made of plastic material.

The invention claimed is:

1. A process for decorating the cylindrical wall of a plurality of containers comprising:

a) mounting a plurality of moving mandrels on a loop circuit, each mandrel being mounted on a support capable of moving such that the axis of the mandrel remains parallel to a given direction D, and able to rotate around its axis while resisting a force exerted perpendicular to the axis;

b) successively bringing each of the plurality of containers flush with one of the plurality of mandrels and fitting the container onto the mandrel;

c) bringing the mandrel thus covered with the container into the vicinity of an impression roll driven in a continuous rotary motion around a fixed axis, wherein the impression roll is a marking roll provided with an etched surface;

d) rotating the mandrel around its axis while it is being moved towards the impression roll, e) running a transfer film bearing strip into the gap between the impression roll and the mandrel covered with the container at a linear velocity equal to the tangential velocities of the roll and container;

f) bringing the mandrel and the impression roll into contact with each other, the cylindrical wall of the container and the surface of the impression roll being driven at a substantially equal tangential velocity, the contact translating into a force exerted by the impression roll on the mandrel through the transfer film bearing strip and the wall of the container;

g) moving the transfer film bearing strip away from the surface of the container, with the result that the part of the transfer film remaining bonded to the container wall is detached from the transfer film bearing strip, thus bringing about the decoration; and h) moving the mandrel covered with the container away from the impression roll to leave room for the next mandrel.

2. The process according to claim 1 wherein the force applied by the raised parts of the etched surface causes the compression of a part of the transfer film which thins out and adheres to the wall of the cylindrical container and, when the transfer film bearing strip is moved away from the surface of the container, the marked part of the transfer film which remains bonded to the container wall is detached from the transfer film bearing strip, thereby bringing about the decoration being implemented.

3. The process according to claim 1 wherein the marking roll is hot and the transfer film is a thermal transfer film.

4. The process according to claim 3 wherein, when the transfer film bearing strip has left the marking area because of the rotation of the mandrel, the transfer film bearing strip is held against the cylindrical wall of the container long enough to allow the transfer film bearing strip and the marked transfer film to cool down to a temperature that makes the film easier to detach by cutting along the boundary between the marked area and the unmarked area.

5. The process according to claim 1 wherein the mandrels are mounted on a turntable, the axis of rotation of which is parallel to the axes of the mandrels.

6. The process according to claim 5 wherein the turntable operates stepwise, the mandrel finding itself at each stop flush with an area for handling or treating the container.

7. The process according to claim 1 wherein the mandrel is made to rotate such that it is able to reach the appropriate velocity before being brought into contact with the impression roll it reaches the marking area.

8. The process according to claim 7 wherein the impression roll rotates at a constant speed of rotation.

9. The process according to claim 1 wherein the position of the axis of the marking roll is defined relative to the trajectory of the mandrels such that when they come into contact with each other, a force is applied to a generatrix line of the container wall that is weak enough for the mandrel to be able to resist mechanically and strong enough for the transfer film to be marked by the raised parts of the etched surface of the roll.

10. The process according to claim 3 wherein the container comprises a cylindrical body having a flexible tube, the cylindrical skirt of which has a thickness of between 250 and 600 microns, the marking temperature required by the hot stamping roll is between 80 and 250° C. and the support force of the roll on the mandrel is between 2 N/mm and 40 N/mm.

11. The process according to claim 3 wherein the transfer film bearing strip is held, after marking, against the cylindrical wall of the container over an aperture angle $\alpha$ over 20°.

12. The process according to claim 3 wherein the transfer film bearing strip is held, after marking, against the cylindrical wall of the container until the surface of the container reaches an average temperature below 80° C.

13. The process according to claim 3 wherein a drive device of the transfer film bearing strip is mounted downstream from the marking area such that the tension of the transfer film bearing strip is as low as possible as it leaves the marking area.

14. The process according to claim 3 wherein, during marking, a device driving the transfer film bearing strip is moved so that it enters the trajectory of the mandrels allowing the transfer film bearing strip to be applied against the container wall, the contact being maintained over an angular aperture over 30°.

15. The process according to claim 3 wherein a cold air flow is circulated over the transfer film bearing strip as it leaves the marking area.

16. The process according to claim 1 wherein, after fitting the container onto the mandrel, and beginning rotation of the mandrel, an optical determination is made of a pre-marked index on the container using an optical tracking device, and the rotation of the mandrel is calculated such that the cylindrical wall of the container comes into contact with the marking roll surface by presenting itself according to a preset angular position, with a tangential velocity substantially equal to the tangential velocity of the etched surface of the marking roll.

17. The process according to claim 16, wherein the optical tracking device allowing the optical determination of a pre-marked index of the decoration is complemented by a second optical device connected to a corrective information system, which through the use of image analysis software, allows the angular and axial position of the mandrel to be corrected.

18. A process for decorating the cylindrical walls of a plurality of containers comprising:

a) mounting a plurality of moving mandrels on a loop circuit, each mandrel having a diameter slightly less than the diameter of the cylindrical wall of the container and being mounted on a support capable of moving such that the axis of the mandrel remains parallel to a given direction D, the mandrel being mounted onto its support in such a way that it is able to rotate around its axis while resisting a force exerted perpendicular to the axis;

b) successively bringing each of the plurality of containers flush with one of the plurality of mandrels and fitting the container onto the mandrel;

c) printing the cylindrical wall of each container in accordance with the required decoration with an ink or varnish promoting the adhesion of a transfer film;

d) bringing the mandrel thus covered with the container into the vicinity of an impression roll, the roll being driven in a continuous rotary motion around a fixed axis parallel to the direction D;

e) rotating the mandrel while it is being moved towards the impression roll at a speed correlated with that of the impression roll such that when the mandrel comes to be flush with the impression roll, the tangential velocity of the container wall in rotation is substantially equal to the tangential velocity of the surface of the impression roll;

f) running a transfer film bearing strip into the gap between the impression roll and the mandrel, such that when it arrives in the gap, the transfer film bearing strip is moving at a linear velocity substantially equal to the circumferential velocities of the impression roll and the mandrel;

g) bringing the mandrel and the impression roll into contact with each other, the contact translating into a force exerted by the impression roll on the mandrel through the transfer film bearing strip and the cylindrical wall of the container, the force causing the compression of the transfer film, translating into an adhesion of a part of the transfer film to the printed part of the cylindrical container wall;

h) moving the transfer film bearing strip away from the surface of the container, with the result that the part of the transfer film remaining bonded to the container wall is detached from the transfer film bearing strip, thus bringing about the decoration, wherein the cylindrical wall of each container is printed in accordance with the required decoration with an ink or varnish promoting the rejection of the transfer film and that, when the mandrel and the impression roll are brought into contact with each other, the contact translates into a force exerted by the impression roll on the mandrel through the transfer film bearing strip and the cylindrical wall of the container, the force causing the compression of the transfer film, translating into an adhesion of a part of the transfer film to the unprinted part of the cylindrical wall; and i) moving the mandrel covered with the and container unit away from the roll in order to leave room for the next mandrel.

19. The process according to claim 18 wherein the transfer film has adhesive properties.

20. The process according to claim 19 wherein the impression roll is hot with the result that when the impression roll leans against the container wall through the transfer film, the latter acquires the adhesive properties.

21. The process according to claim 1 wherein the impression roll is driven by a motor.

22. The process according to claim 21 wherein the motor is an electric motor.

23. The process according to claim 1 wherein the mandrel has a diameter slightly less than the diameter of the cylindrical wall of the container.

24. The process according to claim 3 wherein the transfer film bearing strip is held, after marking, against the cylindrical wall of the container over an aperture angle $\alpha$ over 30°.

25. The process according to claim 3 wherein the transfer film bearing strip is held, after marking, against the cylindrical wall of the container until the surface of the container reaches an average temperature below 60° C.

26. The process according to claim 17, wherein the second optical device is a video camera.

* * * * *

UNITED STATES PATENT AND TRADEMARK OFFICE

CERTIFICATE OF CORRECTION

PATENT NO. : 7,704,345 B2
APPLICATION NO. : 10/597878
DATED : April 27, 2010
INVENTOR(S) : Michel Bosshardt It is certified that error appears in the above-identified patent and that said Letters Patent is hereby corrected as shown below:

Column 13, Claim 7, Line 54:
Please delete “it reaches the marking area.”

Column 16, Claim 18, Line 1:
Please delete “and”

Column 16, Claim 18, Line 1:
Please delete “unit”

Signed and Sealed this

Ninth Day of November, 2010

David J. Kappos
*Director of the United States Patent and Trademark Office*